United States Patent [19]

Price

[11] Patent Number: 5,565,010
[45] Date of Patent: Oct. 15, 1996

[54] METHOD OF MANUFACTURING FOAM RUBBER PLASTIC CLEANING APPARATUS

[76] Inventor: Daryl L. Price, 39 Northboro Rd., Takapuna, Auckland, New Zealand

[21] Appl. No.: 147,131

[22] Filed: Nov. 2, 1993

[30] Foreign Application Priority Data

Sep. 8, 1993 [NZ] New Zealand .................... 248620

[51] Int. Cl.⁶ ................................................. B24D 18/00
[52] U.S. Cl. ............................... 51/297; 51/293; 51/295; 156/265; 156/280; 156/299
[58] Field of Search .......................... 51/293, 295, 297; 451/552, 557; 156/265, 280, 299

[56] References Cited

U.S. PATENT DOCUMENTS

| | | | |
|---|---|---|---|
| 2,457,516 | 12/1948 | Allison | 51/297 |
| 3,261,675 | 7/1966 | Cameron | 51/297 |
| 3,401,490 | 9/1968 | Mora | 51/295 |
| 3,701,703 | 10/1972 | Zimmer, Jr. | 51/297 |
| 4,696,129 | 9/1987 | Roberts | 451/552 |
| 4,821,461 | 4/1989 | Holmstrand | 51/295 |
| 5,147,416 | 9/1992 | Ohishi | 51/295 |

*Primary Examiner*—Jack W. Lavinder
*Attorney, Agent, or Firm*—Abelman, Frayne & Schwab

[57] ABSTRACT

Cleaning apparatus for restoring motor vehicle wiper blades comprising a pad of spongy material having an elongate abrasive-lined groove therein. The surfaces of wiper blades can be restored by working the abrasive groove of the pad to and fro on rubberized surfaces of wiper blades. A method of manufacturing the pad is also described.

4 Claims, 3 Drawing Sheets

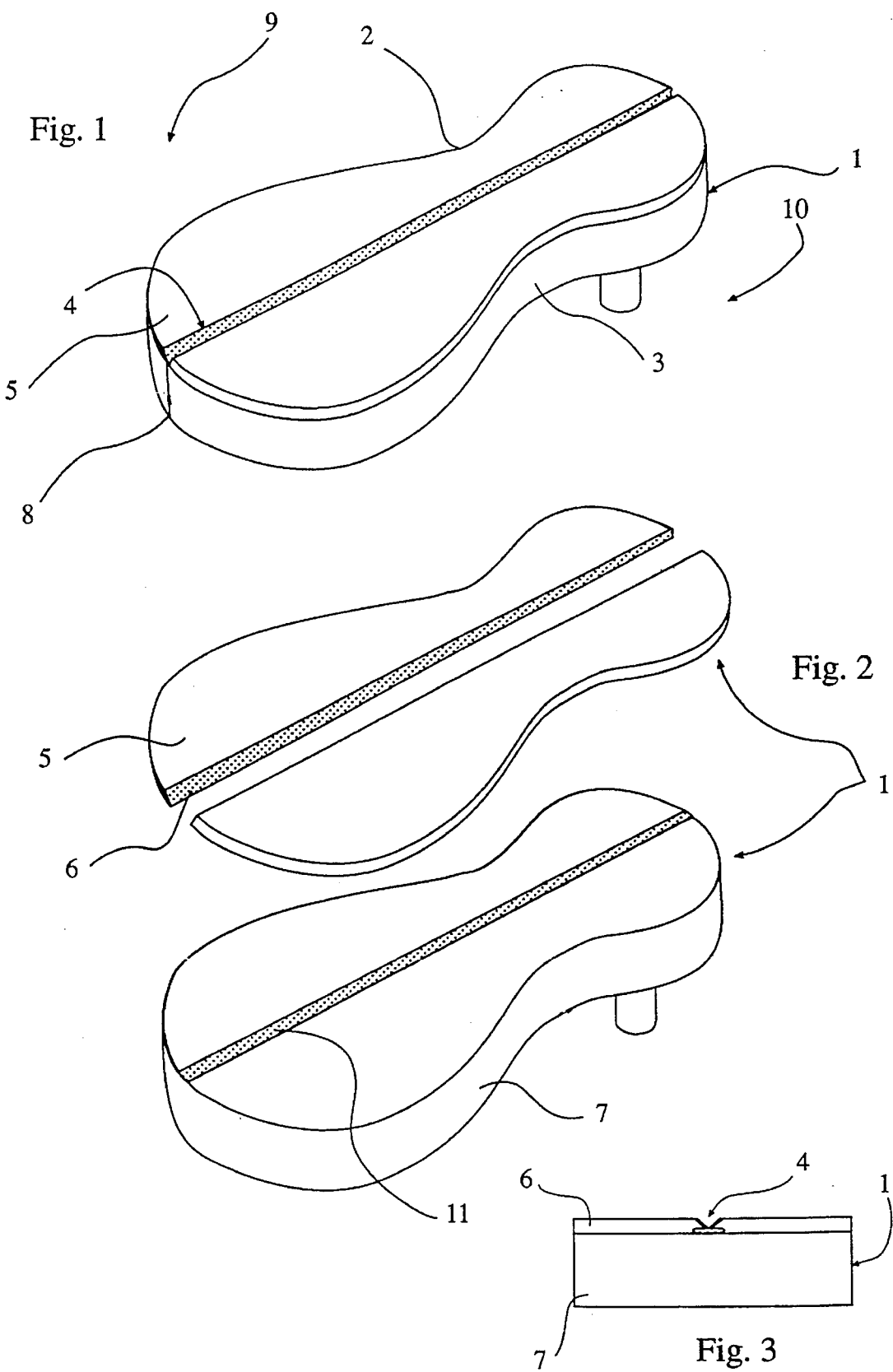

# 5,565,010

METHOD OF MANUFACTURING FOAM RUBBER PLASTIC CLEANING APPARATUS

TECHNICAL FIELD

This invention relates to cleaning apparatus, and more particularly relates to an apparatus adapted or the cleaning and sharpening of rubberised surfaces.

BACKGROUND ART

It has been found that rubberised surfaces, when exposed to the atmosphere, become oxidised, and when used as a blade, for example as a cleaning blade, or a windscreen wiper, lose the edge with which they are initially provided. It has therefore been found necessary and desirable to provide an apparatus capable of cleaning and sharpening such rubber type blades and generally restoring them for further use.

It is to be appreciated that the reference in the specification to wiper blades for motor vehicles is by way of example only, and that the invention as described herein may have advantages in relation to the cleaning and sharpening of any rubberised blade or other means provided with an edge.

It is therefore an object of this invention to provide an improved apparatus and method for the cleaning and sharpening of such rubberised blades.

Further aspects and advantages of the present invention will become apparent from the ensuing description which is given by way of example only.

DISCLOSURE OF INVENTION

According to the present invention there is provided cleaning apparatus comprising a pad of spongy material having an elongate groove therethrough and an abrasive material being applied to opposed edges of the groove.

The abrasive material can be applied to the base of the groove.

The groove can be an inverted T-shaped groove.

The pad can be formed from two laminated strips of resilient polyurethane foam material.

According to a further aspect of the present invention a method of forming the apparatus comprises the steps of:

(a) laminating by bonding two strips of plastics foam material, a first strip of material being of lesser depth than the other, (b) advancing the laminated strips whilst creating a lengthwise, or longitudinal slot between the laminated strips, (c) cutting a lengthwise groove in the first strip of material coincident with the slot to create an inverted T-shaped channel in the laminated strips, (d) bonding an abrasive material to at least the opposed surfaces of the inverted T-shaped channel.

The method can include the further step of bonding an abrasive material to the base of the channel.

The strips can be laminated by juxta-positioning the strips, applying heat to adjacent surfaces of the strips and applying pressure to the two strips as the strips are advanced by a supporting conveyor.

After lamination of the two strips the laminated strips can be bent in a cross-wise direction causing a dove-tail of the channel between the adjacent strips and facilitating the application of adhesive and grit to a region of the base of the channel.

BRIEF DESCRIPTION OF DRAWINGS

This invention will now be described by way of example only, and with reference to one preferred embodiment only of the invention, in which:

FIGS. 1 & 2: are diagrammatic representations of one preferred embodiment only of the invention, and FIG. 3: is a cross-section of the apparatus of FIG. 1, and FIG. 4: is a perspective view of apparatus for manufacturing the apparatus of the present invention.

BEST MODES FOR CARRYING OUT THE INVENTION

Figure 4:
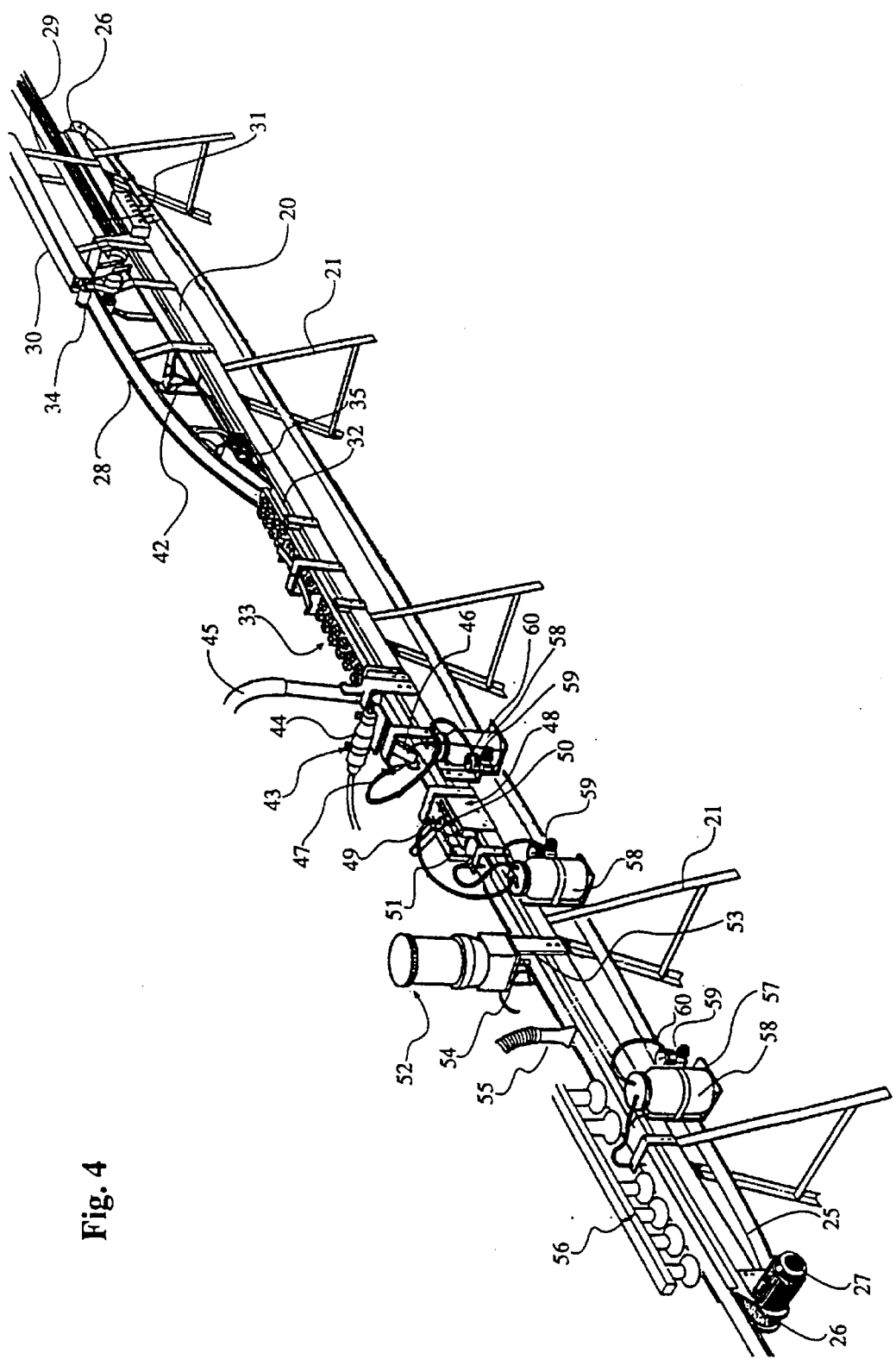

Briefly, the invention provides an apparatus particularly adaptable for the cleaning, sharpening and general restoration of rubberised blades, for instance, including windscreen wiper blades and the like. The invention comprises three sections of resilient material, preferably being foamed polyurethane plastic. A groove is provided along one surface of the laminated sections of resilient material and the groove is provided with a fine abrasive type material which is disbursed along the surface of the groove and affixed hereto. The arrangement is such that a rubber type blade may be movable within the groove the resilient shape of which will conform to the cross-sectional shape of the wiper blade, so that the abrasive material will clean, sharpen and generally restore the blade for further use.

The invention further provides, according to a preferred embodiment, that the groove may be filled with water or other lubricating material to facilitate more convenient use of the cleaning apparatus.

Now, with particular reference to FIGS. 1 and 2 of the drawings, there is provided a cleaning apparatus generally indicated by arrow 1 in FIG. 1 of suitable dimensions, with suitable finger and thumb recesses 2, 3 either side for ease of grip if wet (FIG. 1) to be manually grasped and moved over, (for example) a wiper blade or other rubber edged object. In preferred embodiments, the apparatus may be formed of resilient foam polyurethane materials, and may be of approximately 15 mm in depth in cross-section with a length of approximately 80–90 mm so as to be easily placed within the hand of the person about to use the apparatus. The apparatus is comprised of a laminate of material, which may preferably be polyurethane foam, and includes a groove as generally indicated by arrow 4 (FIG. 1) formed through the upper strip 5 of the laminate.

The groove may be shaped to provide tapered portions 6 and a gap 8 of approximately 1 mm in preferred embodiments may be left on the surface of lower strip 7 of the laminate.

Because of its resilient nature the apparatus can be manually bent prior to use in the direction of arrows 9 and 10 (FIG. 1) thus forming a slightly convex curve on the grooved surface. This action has the effect of widening the groove 4 slightly and may generally facilitate the easier tracking of (for example) a wiper blade onto the apparatus.

It is of course to be appreciated that the cross-sectional shape of the groove will substantially conform to the shape of the object it is designed to clean.

A fine abrasive type grit material 10, 11 (FIG. 2) is provided within and at the base of the groove 4. In one preferred embodiment of the invention the grit material is dispersed on the surface of the groove and affixed thereto by contact gluing or the like. However, alternative embodiments are envisaged wherein the grit material is integrally formed in the resilient material 1, or is provided as an additional insert in the groove 4.

It is to be appreciated that the number "8" shape of the apparatus described is optional and that the device may be made in many other shapes to suit a customers requirements.

Figure 5:
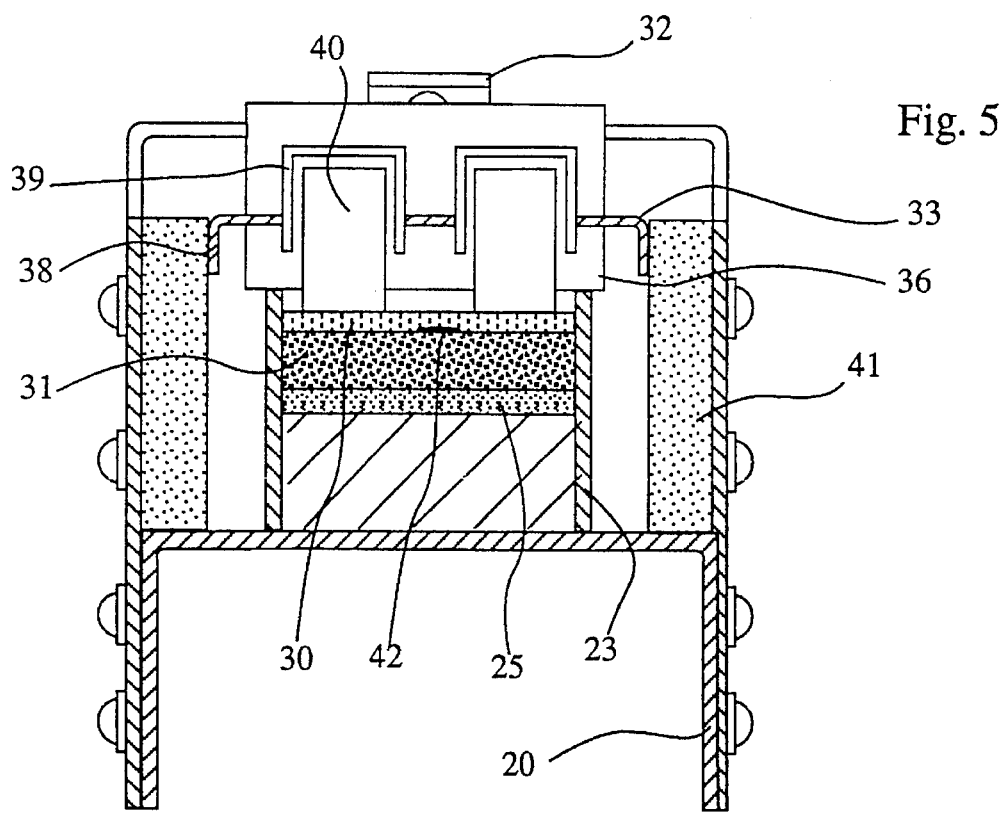
FIGS. 5 & 6: are enlarged sectional views of the apparatus of FIG. 4 during taken at V:V and VI:VI respectively.
Figure 6:
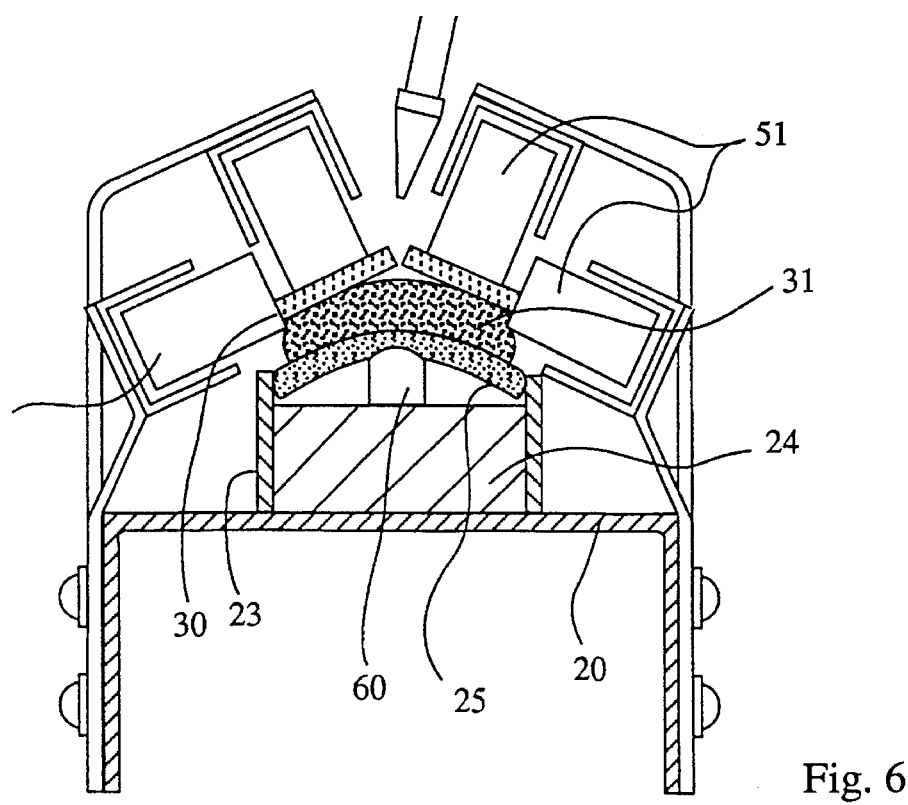

With respect to FIGS. 4, 5 and 6 of the drawings, apparatus for manufacturing the cleaning apparatus comprises an elongate inverted channel member 20, supported by supports 21. The channel member 20 mounts channel sides 23 and an insert 24 which defines a passage for a continuous conveyor belt 25. The conveyor belt 25 has end rollers 26 and is driven by an electric motor 27.

At the head of the apparatus strips of foam material are mounted on slide 28 and the conveyor belt 25. The slide 28 which is U-shaped and is supported from the channel 20 by supports 29 and the function of the slide is to deliver thinner strips of foam material 30 onto thicker strips of foam material 31 in a co-ordinated manner to an opening 32 between the conveyor belt 25 and a pressure plate generally indicated by arrow 33. FIG. 5 is an enlarged cross-section at the pressure plate region.

A motorised pinch roller 34 drives individual thinner strips of material 30 to the opening 32 and the conveyor belt 25 conveys the thicker strips 31 to the same position. Opposed surfaces of the strips 30, 31 are heated by a blower 35.

The pressure plate 33 comprises bridges 36 mounted with respect to a tension bar bracket 37. The bridges support roller cage member 38 having a plurality of roller mounting members 39 and rollers 40. Buffer blocks 41 of resilient material are interposed between the edges of the cage members 38 and wall 23. Downward pressure on the bridges is applied by a tension bar 37.

Immediately following the pressure plates 33 a cutter generally indicated by arrow 43 is mounted from the channel 20. The two major elements of the cutter 43 are a cutting wheel (not shown) driven by a motor 44 and an associated suction device 45. The wheel of the cutter is positioned inside the suction device 45 to cut the groove in the laminated strips as the suction device removes waste material.

Whilst the lamination is beneath the pressures plates 33 and cutter 43 a thin flat metal probe 42 ensures that a lengthwise slot is created in the lamination. The presence of the probe 42 also helps to position the laminate relative to the cutter. After the laminate passes the cutter 43 a primming wheel 46 opens the groove and a priming nozzle 47 applies a diluted mixture of thinner and adhesive into the channel. An adhesive applicator generally indicated by arrow 48 is positioned immediately adjacent the primming wheel 46.

The adhesive applicator 48 has a first nozzle 49 which applies adhesive to the sides of the channel and a second nozzle 50 which applies adhesive to the base of the channel. Sets of supported guide rollers 51 (FIG. 6) ensure the laminate is centered in the adhesive applicator.

A bridge 60 is in the path of the laminate as it passes beneath the adhesive applicator which ensures that the laminate is arched as illustrated by FIG. 6 to better facilitate the application of adhesive/primer.

An abrasive applicator generally indicated by arrow 52 applies abrasive to the surfaces having adhesive thereon. The abrasive applicator 52 rests on a support 53 and a nozzle 54 sprays adhesive particles onto the channel surfaces as the laminate passes it.

A vacuum cleaner 55 is positioned adjacent the abrasive applicator to clean up any excess abrasive as the laminate passes beneath it.

Finally, the laminate passes beneath a bank of heat lamps 56 to accelerate drying and a spray device 57 can provide a final fixing coat of thinned glue to the abrasive coated surfaces.

The adhesive or primer applicators each include pressurised container 58 of adhesvie or primer mounted to the side of the conveyor with pressure within the container being controlled by valves 59 and monitored by gauges 60.

The inverted T-shaped channel in the apparatus has a number of advantages. It prevents build-up of oxidised rubber from wiper blades which would occur if the apparatus had a single vertical groove, it serves as a water (lubricant) reservoir during use, it provides further "working" surfaces as wiper blades can be cleaned on horizontal or vertical planes and the groove compliments the shape of most wiper blades.

The laminated strip can be cut into any chosen shape and configuration as discussed earlier.

Thus, by this invention there is provided an apparatus particularly suitable for the cleaning and sharpening of wiper blades and other blades of rubber or similar material for use as wiper blades for the windscreens of motor vehicles, or for other wiping or cleaning purposes which may be known.

Finally, it is to be appreciated that the invention has been described by way of example only, and that modifications, alternations and additions may be made to the invention without departing from the scope of the invention as defined in the appended claims.

I claim:

1. A method of manufacturing a cleaning apparatus, said cleaning apparatus comprising a pad of spongy material having an elongate groove therethrough, said groove provided with an abrasive material on its opposed edges, the method comprising the steps of:

(a) laminating by bonding two strips of plastic foam material, a first strip of material being of lesser thickness than the other, (b) advancing the laminated strips whilst creating a lengthwise unbonded slot between the laminated strips, (c) cutting a lengthwise groove in the first strip of material coincident with the unbonded slot to create an inverted T-shaped channel in the laminated strips, (d) bonding an abrasive material to at least the opposed surfaces of the inverted T-shaped channel.

2. The method of claim 1, including the further step of bonding an abrasive material to the base of the channel.

3. The method of claim 2 wherein the strips are laminated by juxta-positioning the strips, applying heat to adjacent surfaces of the strips and applying pressure to the two strips as the strips are advanced by a supporting conveyor.

4. The method of claim 1 wherein after lamination of the two strips the laminated strips are bent in a cross-wise direction causing a dovetail of the channel between the adjacent strips of the channel and facilitate the application of adhesive and grit to a region of the base of the channel.

* * * * *